United States Patent
Lamvik et al.

(10) Patent No.: US 7,495,638 B2
(45) Date of Patent: Feb. 24, 2009

(54) VISUAL DISPLAY WITH INCREASED FIELD OF VIEW

(75) Inventors: Michael K. Lamvik, Durham, NC (US); Gary E. McGuire, Chapel Hill, NC (US); John S. Lewis, III, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 344 days.

(21) Appl. No.: 10/437,091

(22) Filed: May 13, 2003

(65) Prior Publication Data

US 2004/0227703 A1 Nov. 18, 2004

(51) Int. Cl.
G09G 3/30 (2006.01)
(52) U.S. Cl. ...................................... 345/76
(58) Field of Classification Search .............. 345/204, 345/133, 3.3, 7–8, 76, 694–698, 96; 351/206
See application file for complete search history.

(56) References Cited

U.S. PATENT DOCUMENTS

| | | | |
|---|---|---|---|
| 4,656,515 A | | 4/1987 | Christopher |
| 4,661,809 A | * | 4/1987 | Anderson et al. ............. 345/86 |
| 4,777,481 A | | 10/1988 | Craver |
| 5,071,209 A | | 12/1991 | Chang et al. |
| 5,166,511 A | | 11/1992 | Kreider et al. |
| 5,422,653 A | * | 6/1995 | Maguire, Jr. .................... 345/9 |
| 5,438,442 A | | 8/1995 | Katakura |
| 5,481,275 A | * | 1/1996 | Mical et al. .................. 345/698 |
| 5,552,911 A | | 9/1996 | Okada et al. |
| 5,726,670 A | | 3/1998 | Tabata et al. |
| 5,808,589 A | * | 9/1998 | Fergason ........................ 345/8 |

(Continued)

FOREIGN PATENT DOCUMENTS

EP 0 618 471 A2 10/1994

OTHER PUBLICATIONS

K. Kubala, A. Hatch, R.B. Hooker, L. Lewis; Investigation into Variable Addressibility Image Sensors and Display Systems; Bell Aerospace & Technologies Corp.

(Continued)

*Primary Examiner*—Sumati Lefkowitz
*Assistant Examiner*—Tammy Pham
(74) *Attorney, Agent, or Firm*—Oblon, Spivak, McClelland, Maier & Neustadt, P.C.

(57) ABSTRACT

This invention provides a continuous display with non-uniform pixel density, forming a foveated display. A single, continuous display has a higher pixel density at the center of the display than at the periphery of the display. Where two continuous displays are used in accordance with the present invention, the central forward gaze of the viewer's image will be displayed in high resolution while the leftmost portion of the left eye display will be in low resolution and the rightmost portion of the right eye display will be in low resolution. The pixel resolution of the visual display may correspond to the visual acuity of the human eye. A foveated image display system using a continuous display with non-uniform pixel density increases the field of view while reducing the image bandwidth. A foveated image display system may be hardware-based by employing anamorphic lenses or sensors rather than relying upon image interpolation to modify the resolution of the resultant image data communicated to the continuous display with non-uniform pixel density.

59 Claims, 11 Drawing Sheets

U.S. PATENT DOCUMENTS

| | | | |
|---|---|---|---|
| 5,899,550 | A | 5/1999 | Masaki |
| 5,982,549 | A | 11/1999 | Kubala et al. |
| 6,115,007 | A * | 9/2000 | Yamazaki ................. 345/7 |
| 6,198,516 | B1 | 3/2001 | Kim et al. |
| 6,215,499 | B1 * | 4/2001 | Neff et al. ................ 345/419 |
| 6,222,675 | B1 | 4/2001 | Mall et al. |
| 6,636,185 | B1 * | 10/2003 | Spitzer et al. ................ 345/8 |
| 2002/0021460 | A1 * | 2/2002 | Hansen |
| 2002/0109819 | A1 * | 8/2002 | Tuval ...................... 351/206 |
| 2002/0167531 | A1 | 11/2002 | Baudsich |

OTHER PUBLICATIONS

I. Debusschere, et al.; Sensors And Actuators; Proceedings of the 5th International Conference on Solid-State Sensors and Actuators and Eurosensors III, Jun. 25-30, 1989; pp. 456-460; vol. A22 Nos. 1-3; Completing vol. A22.

G. Kreider, et al.; Charge-Coupled Devices and Solid State Optical Sensors; Proceedings SPIE—The International Society for Optical Engineering; Feb. 12-14, 1990; pp. 133-140; vol. 1242.

K. Kubala, A. Hatch, R.B. Hooker, L. Lewis; Investigation into Variable Addressibility Image Sensors and Display Systems; Bell Aerospace & Technologies Corp, May 1998.

* cited by examiner

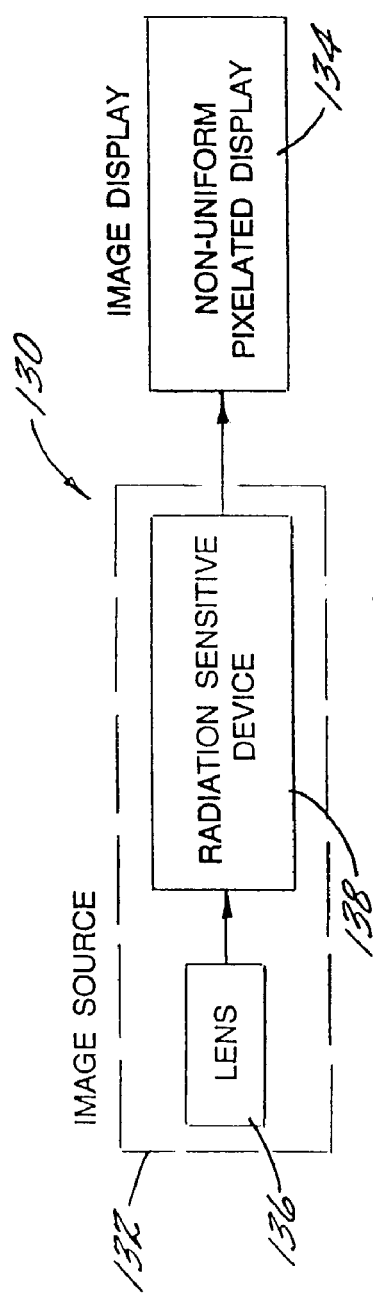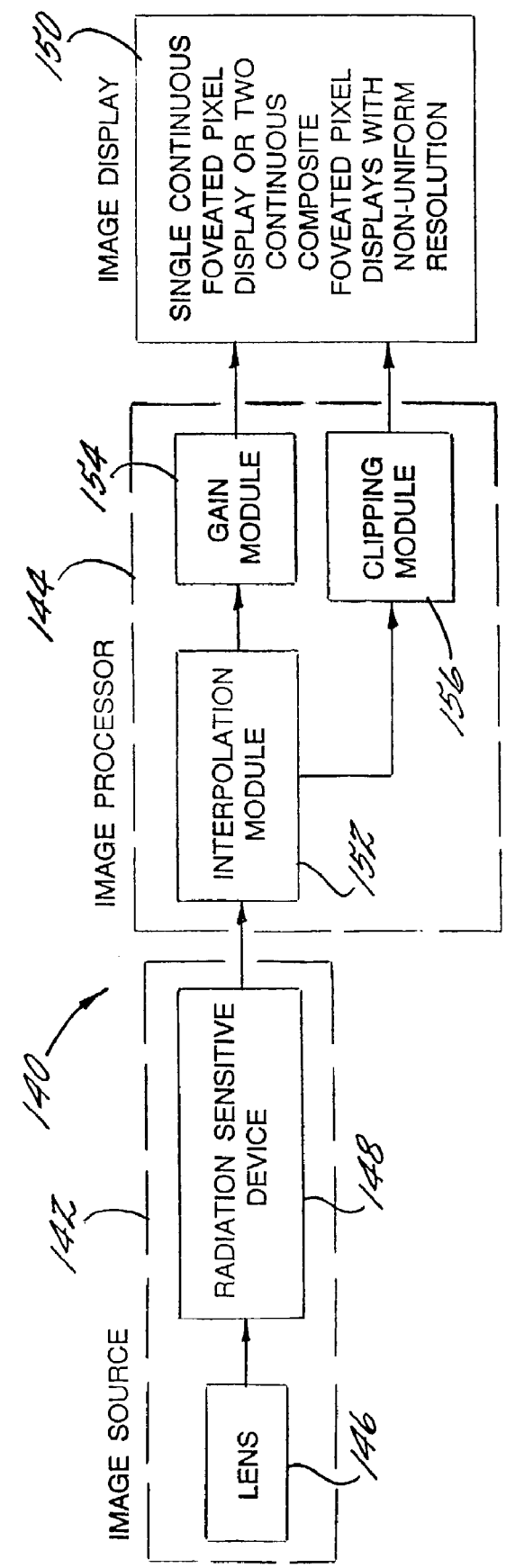

VISUAL DISPLAY WITH INCREASED FIELD OF VIEW

FEDERALLY SPONSORED RESEARCH OR DEVELOPMENT

The U.S. Government may have certain rights in the present invention as provided by the terms of Contract Numbers DAAD19-00-2-0003 and DAAD19-00-2-0003 awarded by the United States Army.

FIELD OF THE INVENTION

The present invention relates generally to image displays and display systems, and, more particularly, to near-eye optical image displays and display systems with varying resolutions for foveated viewing.

BACKGROUND OF THE INVENTION

The human eye provides a foveal characteristic of vision. The central region of the retina, the fovea, is capable of interpreting higher resolution imagery, greater detail, than surrounding regions of the retina. Visual acuity of the retina falls off further from the fovea, as the foveal angle increases. Consequently, the human eye resolves high resolution at the center of the field of view and continually decreasing resolution at greater peripheral areas of the field of view. This high-resolution central field of view and lower-resolution peripheral field of view can be described as the foveated characteristic of vision.

Some prior visual displays have attempted to take advantage of the foveated characteristics of human vision. Because peripheral vision does not see high resolution, there is no reason to use a high density of pixels in the periphery of the visual display. However, peripheral vision is sensitive to movement in changes and intensity, therefore, it is important to retain peripheral vision as an early-warning or indication of approaching hazards, rather than only displaying a narrow field of view. Generally, visual displays which can benefit from the foveated characteristics of human vision are near-eye or head-mounted visual displays.

Some of the benefits of employing foveated visual displays include increasing the field of view, decreasing the total image data and associated bandwidth required to present high resolution only at the center of an image and low resolution in the periphery, and lower computer system dependency allowing for faster refresh rates of images on the visual display and increased complexity of the visual data being displayed.

Some previous displays attempted to create foveated images using optical systems such as U.S. Pat. No. 5,808,589 to Fergason and U.S. Pat. No. 6,222,675 to Mall et al. Other existing visual display systems attempted to create foveated images using software interpolation techniques that reduce the pixel resolution at increasing peripheral regions of the image being displayed by clustering pixels in the periphery of a display. Two examples are U.S. Pat. No. 5,071,209 to Chang et al. and U.S. Pat. No. 5,726,670 to Tabata et al. However, each of these visual display systems suffer from a reliance upon a redundancy of image information being presented to the viewer or the computer system. For example, in the Mall et al. '675 patent one eye of the viewer sees the entire field of view in low resolution and another eye of the viewer sees the central region of the field of view in high resolution. The user interprets this as a combined visual display with high resolution at the center and low resolution on the periphery. A similar effect is presented in the Fergason '589 patent where a high-resolution central image overlays a wide field of view, low-resolution image. The redundancy of both of these systems requires increased circuitry and a higher data load on any associated computer processing system. An additional disadvantage of primarily ocular systems is the substantial complexity, size, and weight of the components required for such a system.

Furthermore, existing near-eye visual displays that rely upon optical projection systems or flat computer generated displays often cause discomfort for the viewer because they fail to accommodate the severe angle between the eyes and peripheral images on the display. One method proposed to correct this problem is varying the horizontal width of pixels as disclosed in U.S. Pat. No. 6,115,007 to Yamazaki. A disadvantage of the Yamazaki '007 patent is the need to adjust the pixel width on existing flat panel visual displays, requiring an additional step of software image interpolation. Furthermore, existing near-eye displays have substantial disadvantages including excessive and awkward weight and small viewing screens.

BRIEF SUMMARY OF THE INVENTION

Unlike prior visual displays with increased field of view, the present invention solves several problems of ocular display systems and high-load software interpolation techniques by reducing the use and dependency of each.

The invention provides a continuous display surface with non-uniform pixel density. A continuous display surface of the present invention may be a single pixelated display, such as an organic light emitting diode (OLED), or an array of panel displays, such as an array of liquid crystal displays (LCD). A viewing system may include two continuous display surfaces or panel arrays separated by a physical structure so a viewer's left eye will not see the right display and a viewer's right eye will not see the left display. These displays or arrays may be curved to better conform to the shape of a viewer's head.

The pixel resolution of a visual display of the present invention corresponds to the visual acuity of the human eye. In order to increase the field of view of a display, the central region displays high-resolution imagery and the periphery displays low-resolution imagery. For example, a single, continuous display will be composed of a higher pixel density at the center of the display than at the periphery of the display. Where two continuous displays are used in accordance with the present invention, the central forward gaze of the viewer's image will be displayed in high resolution while the leftmost portion of the left eye display will be in low resolution and the rightmost portion of the right eye display will be in low resolution.

The non-uniform pixel spacing required to create the foveated images presented on a curved display is provided by an image source. An image source according to the present invention may consist of several variations of lenses and radiation sensors in order to provide a hardware-based, or hard-wired, foveated viewing. The present invention refers to hardware-based as the process of directly providing foveated images to the image display from the image source without the need for an intermediate step of image interpolation. This advantage of the present invention may be employed to drastically reduce the load and bandwidth on any associated computer system. Ideally, the non-uniform radius of curvature of a lens of an image source or the non-uniform resolution of a radiation sensor and the pixel density of the image display would match the visual acuity of the human eye. By recording foveated imagery and displaying corresponding foveated imagery, the present invention is able to provide foveated viewing using specific adaptations of hardware rather than relying upon additional processing of image interpolation.

In one advantageous embodiment of the invention an anamorphic lens can distort the incoming image onto a linear radiation sensor. The linear radiation sensor may be a camera with a linear lens. This type of image source system would be ideal for using a continuous, curved visual display or panel array. Another embodiment of the present invention uses two anamorphic lenses each providing foveated view for a single eye. The right anamorphic lens providing imaging for the right eye would provide higher resolution at the central region of the relaxed forward gaze of the right eye and lower resolution at the periphery of the right eye. Similarly, the left anamorphic lens would provide high resolution for the relaxed forward gaze of the left eye and low resolution in the periphery of the left eye. In order to provide the non-uniform resolution imagery, these anamorphic lenses may be aspherical and may have non-uniform curvature across the surface.

Another advantageous embodiment of the hardware-based foveated viewing would include linear lenses and anamorphic sensors. This embodiment would require continuous anamorphic sensors without dead zones or areas within the sensor which do not record radiation information. This continuous aspect of the sensors is required to provide a full image on a continuous display of varying pixel sizes.

The displays of the present invention can also be used when using linear lenses and sensors and an image processor that includes an image interpolator that transforms the linear image into a variable acuity image that can be displayed on the single or dual continuous displays or arrays. A fixed or hard-coded interpolation scheme may also be used. Many variations of lenses and sensors or cameras can be employed using an image interpolator. For example, a lens and sensor can be used in coordination with a single display device. Two linear lenses and radiation sensors can be used for dual continuous display devices. To further reduce the load on the image processor by reducing the image data bandwidth, multiple cameras of higher and lower resolution can be used to input the source image in the central or periphery regions of the display. For example, four low resolution cameras can be used to generate the source image periphery and one or two high resolution cameras can be used to generate the central region. To further reduce the image data bandwidth and processor load, anamorphic lenses or anamorphic sensors can be used in dual input formats where high resolution and low resolution input sources are used to create the source image.

The present invention may include additional input sources for infrared (IR) or ultraviolet (UV) radiation, or the existing input devices can be adjusted to accept more than wavelengths in the visual spectrum. Also, the image processor may include a merge module to merge or fuse two different image sources together into a final image that will be displayed on the single or dual continuous display or arrays. Additionally, the image processor may include a gain module to improve low-light viewing or a clipping module to limit high amplitudes of light that may damage the human eye.

Each of these embodiments is intended to eliminate the redundancy of high resolution images being overlaid onto low resolution images to create a synthesized foveated image. The single or dual continuous displays are intended to eliminate the need for an optical viewing system rather than a non-uniform, pixelated viewing system. The curvature of the displays or arrays is intended to limit the severe angle between a viewer's eyes and the peripheral images on the display.

BRIEF DESCRIPTION OF THE DRAWINGS

Figure 1:
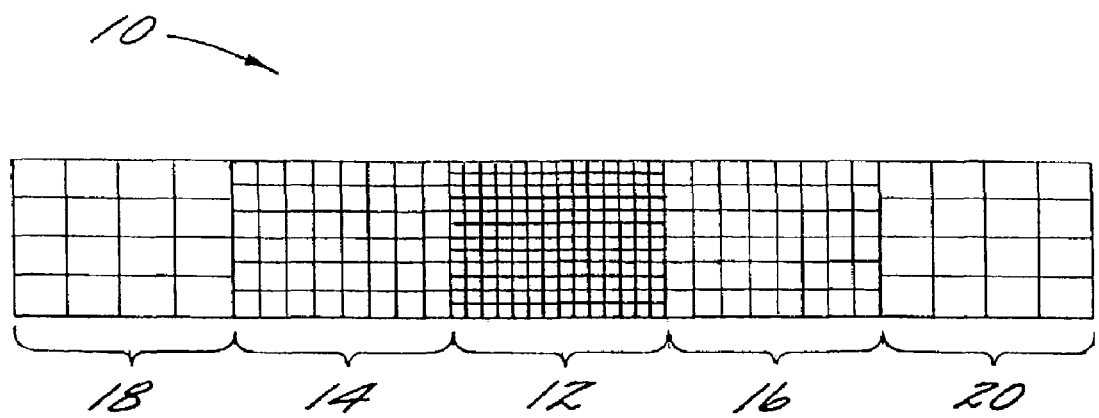
Figure 2:
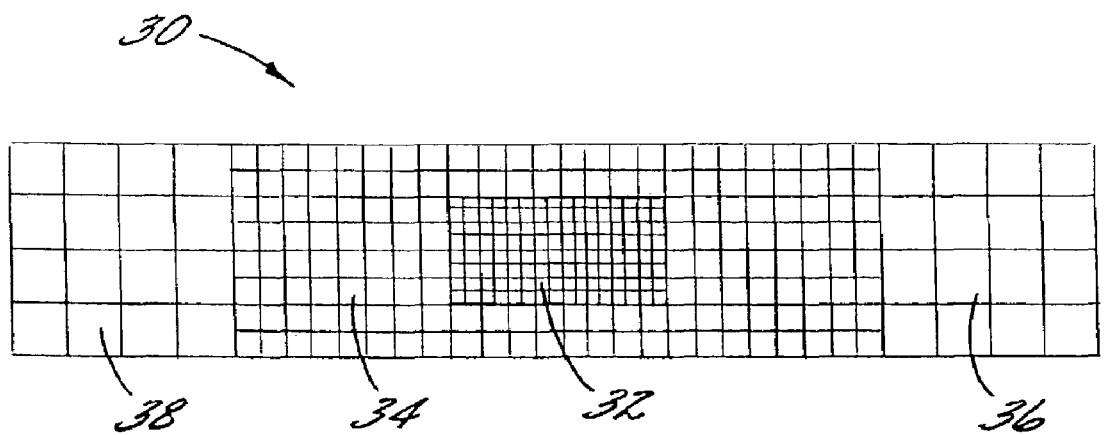
Figure 3:
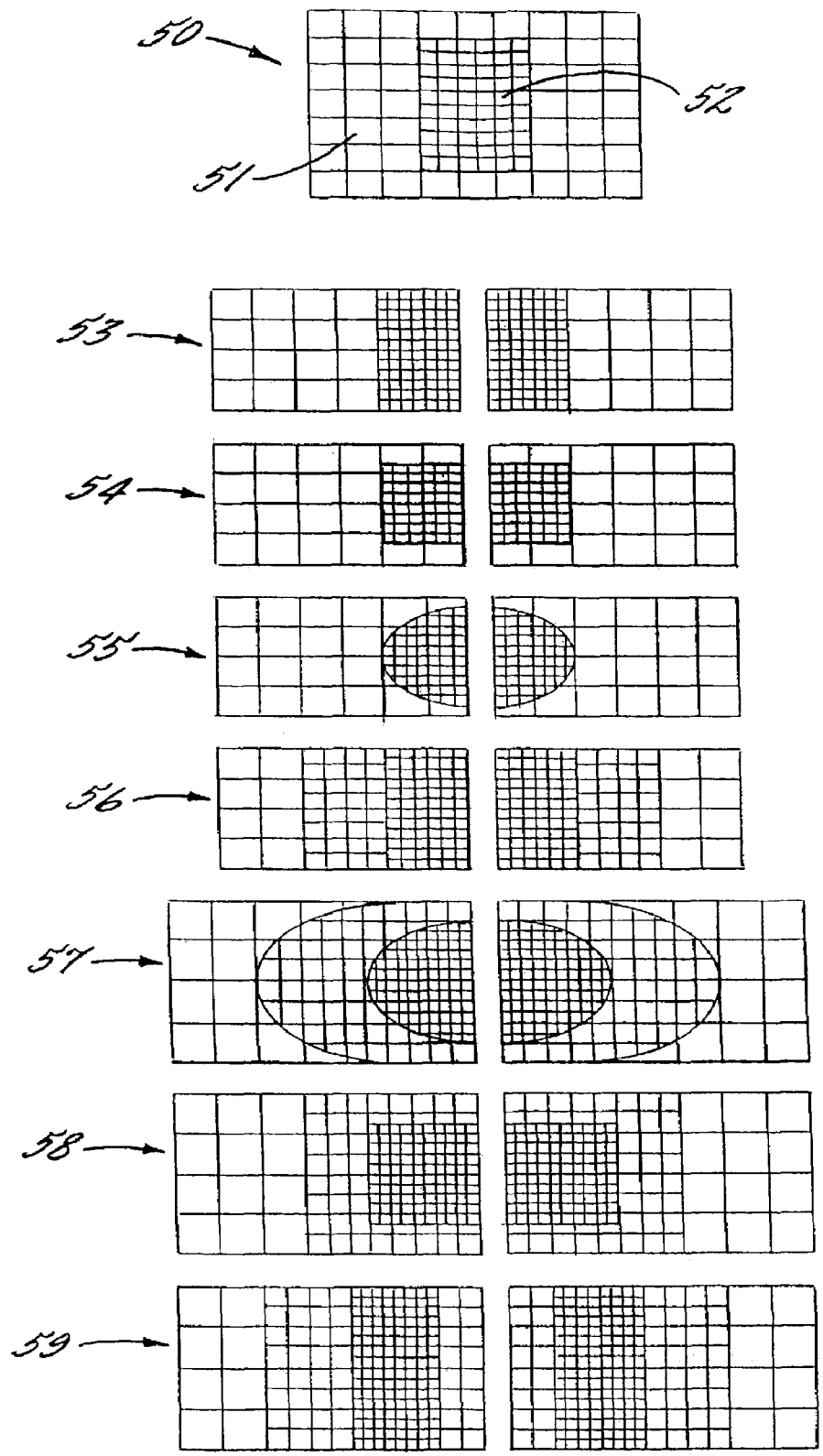
Figure 4:
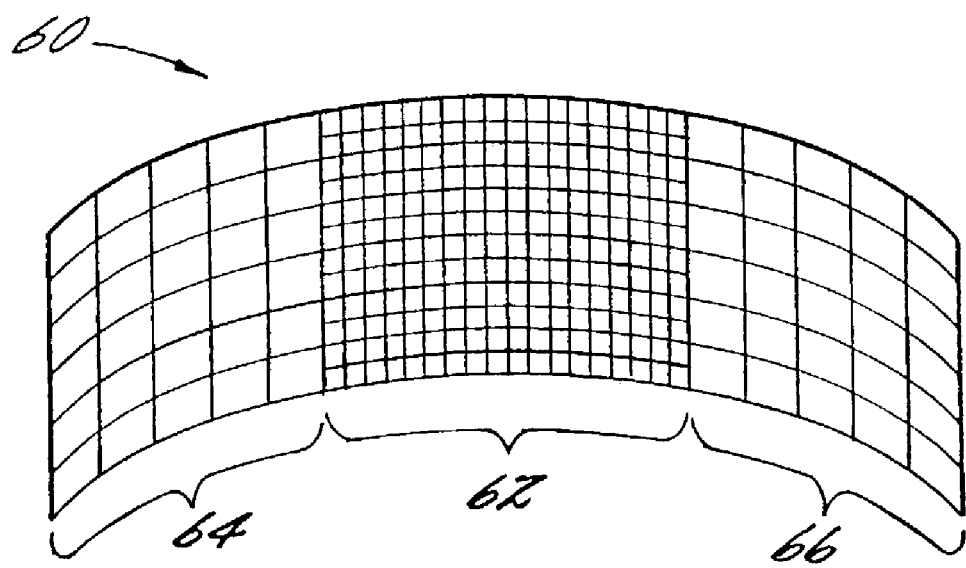
Figure 5:
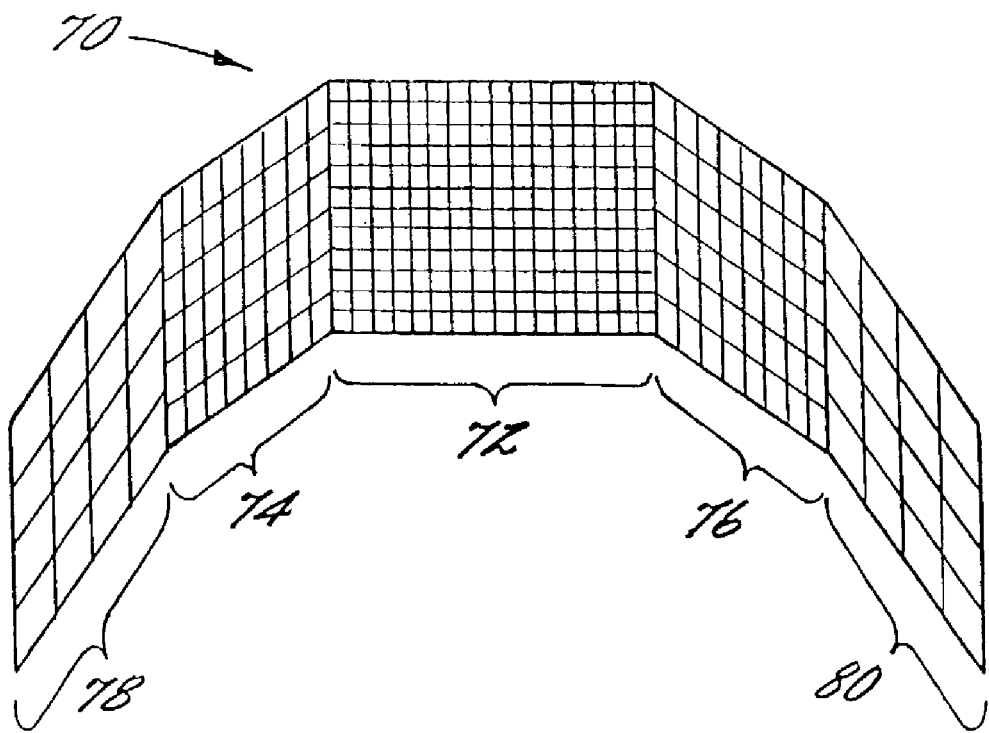
Figure 6:
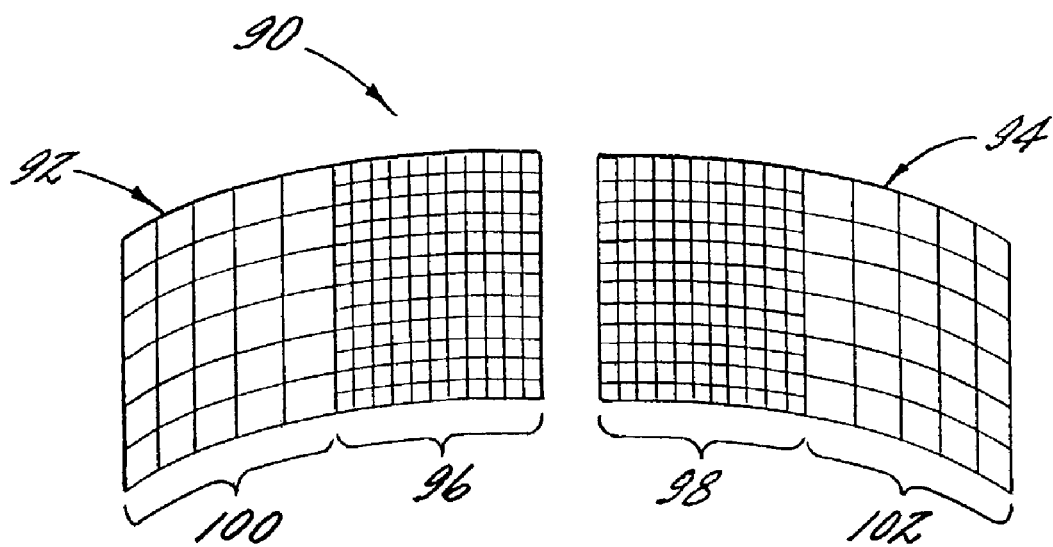
Figure 7:
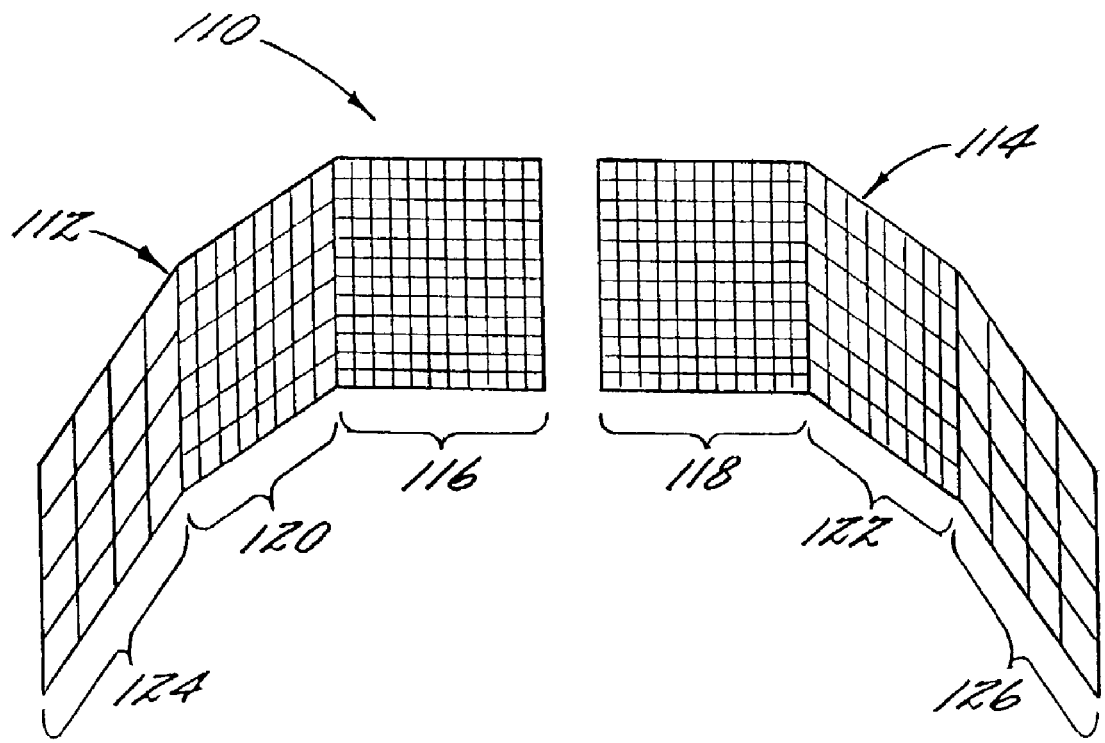
Figure 10:
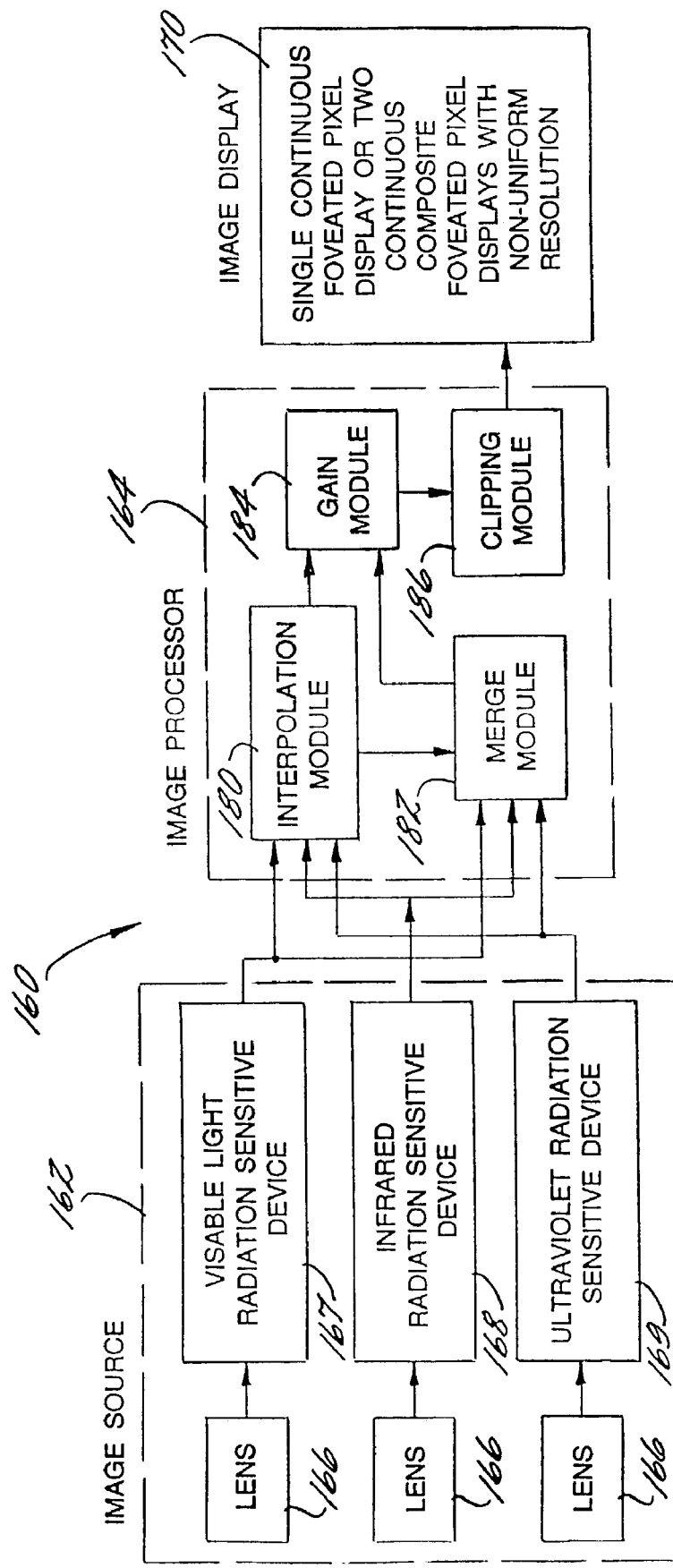
Figure 11:
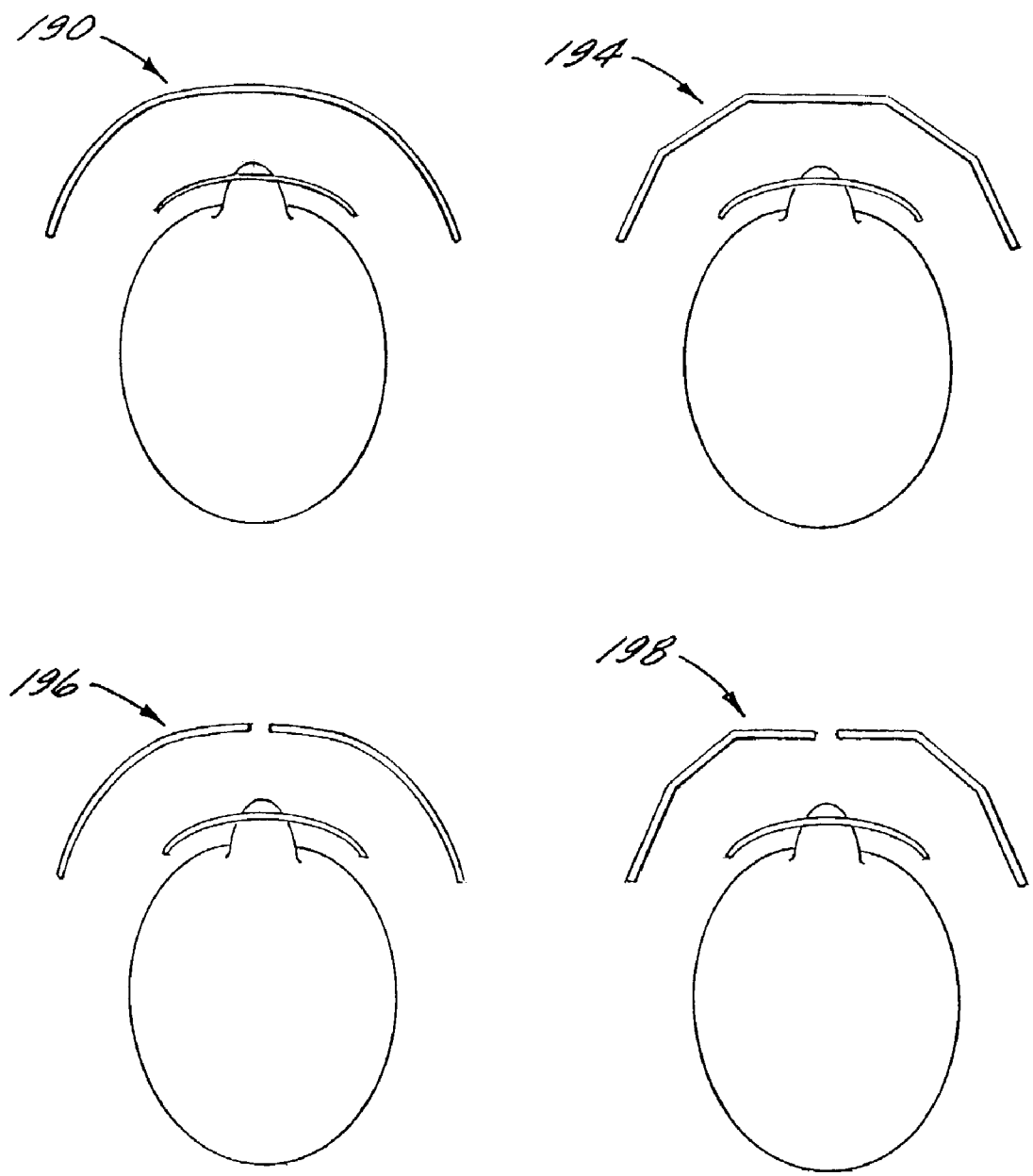
Figure 12:
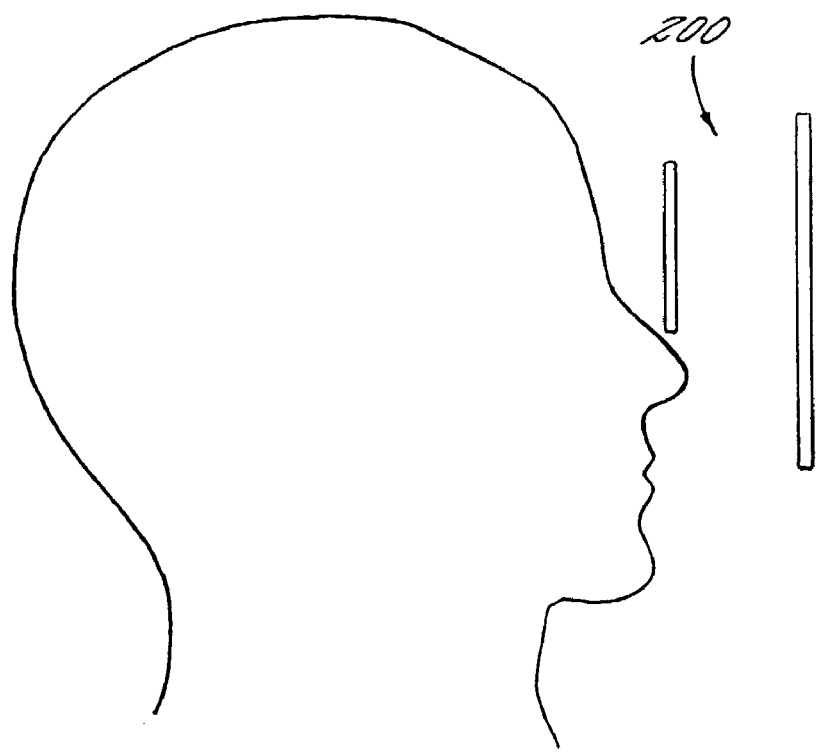
Figure 13:
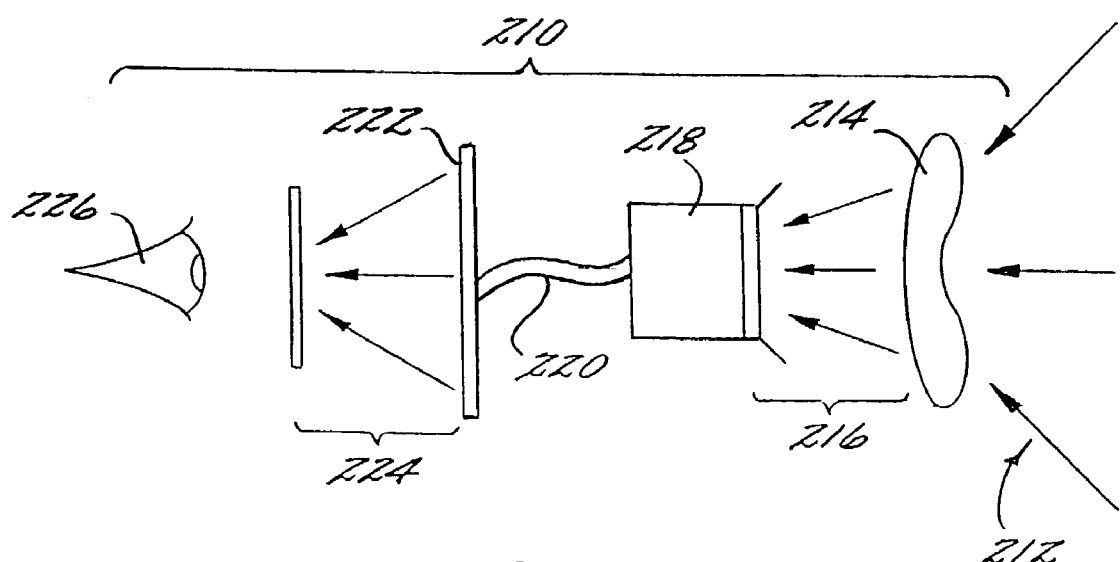
Figure 14:
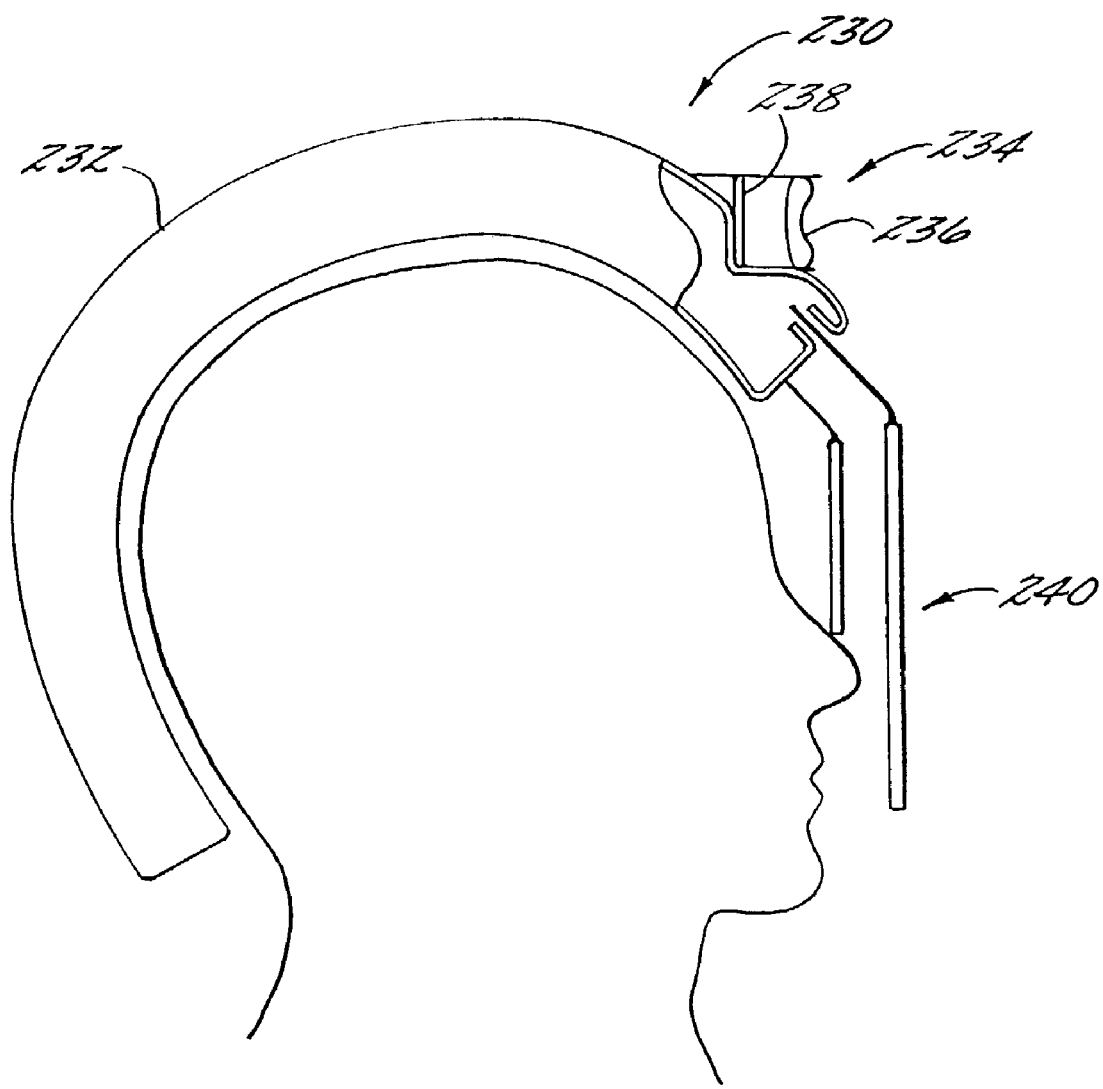
Figure 15:
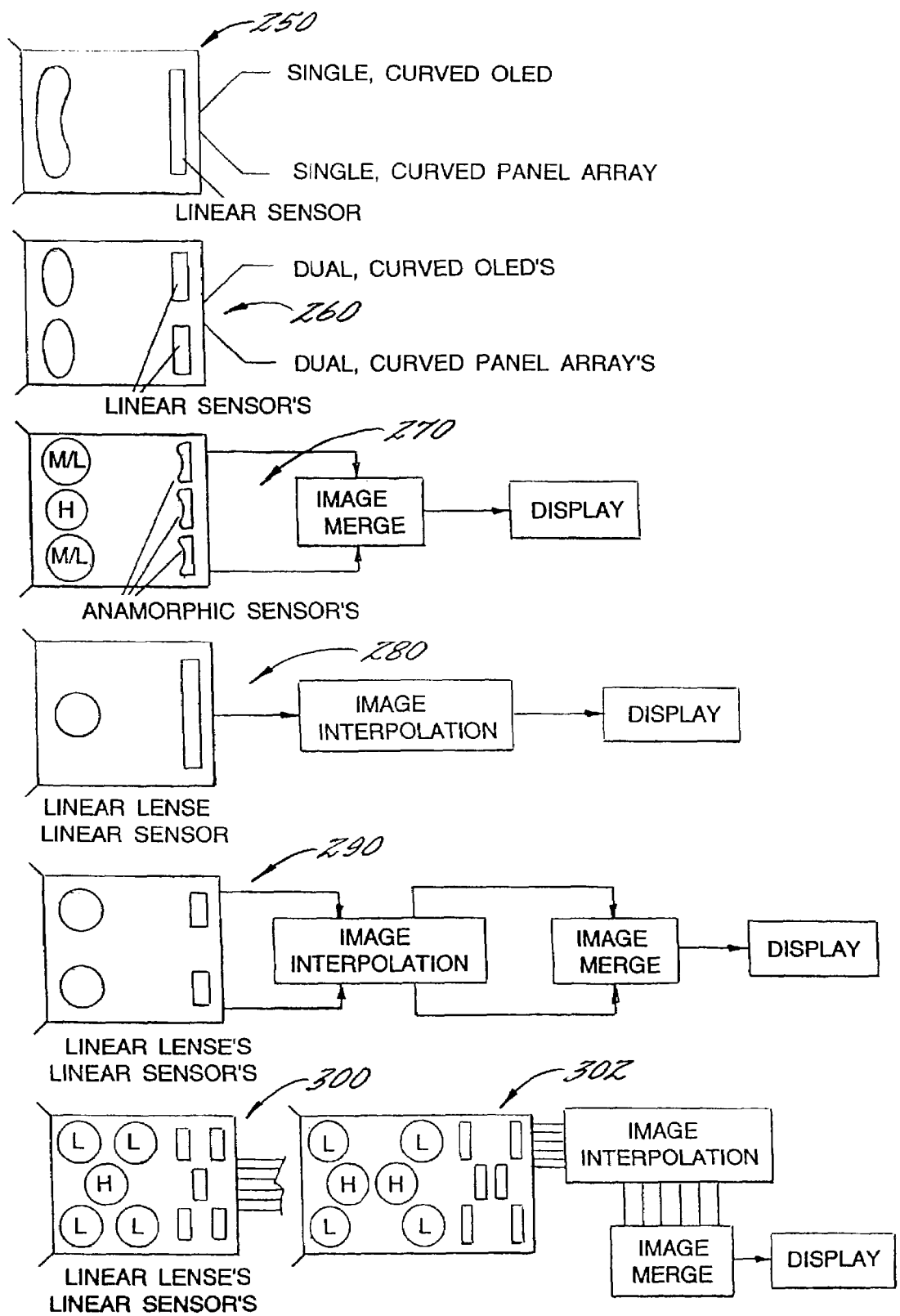

Having thus described the invention in general terms, reference will now be made to the accompanying drawings, which are not necessarily drawn to scale, and wherein:

FIG. 1 is a first embodiment of a continuous display with non-uniform pixel density;

FIG. 2 is a second embodiment of a continuous display with non-uniform pixel density;

FIG. 3 shows several alternate embodiments of continuous displays with non-uniform pixel density;

FIG. 4 is a first embodiment of a curved continuous display with non-uniform pixel density;

FIG. 5 is a second embodiment of a curved continuous display with non-uniform pixel density;

FIG. 6 is a third embodiment of a curved continuous display with non-uniform pixel density;

FIG. 7 is a fourth embodiment of a curved continuous display with non-uniform pixel density;

FIG. 8 is a block diagram of a display system using a continuous display with non-uniform pixel density;

FIG. 9 is a block diagram of a display system using a continuous display with non-uniform pixel density and including an image processor;

FIG. 10 is a block diagram of a display system with multiple image source elements using a continuous display with non-uniform pixel density;

FIG. 11 shows alternate cross-sectional representations of viewers using alternate embodiments of the present invention as seen from above;

FIG. 12 shows a cross-sectional representation of a viewer using an embodiment of the present invention as seen from the side;

FIG. 13 is a schematic diagram of a hardware-based foveated viewing system;

FIG. 14 shows a cross-sectional representation of a head mounted display apparatus using a foveated viewing system and a continuous display with non-uniform pixel density as seen from the side; and FIG. 15 shows alternate embodiments of lens and camera arrangements for hardware-based foveated viewing systems of the present invention.

Figure 16:
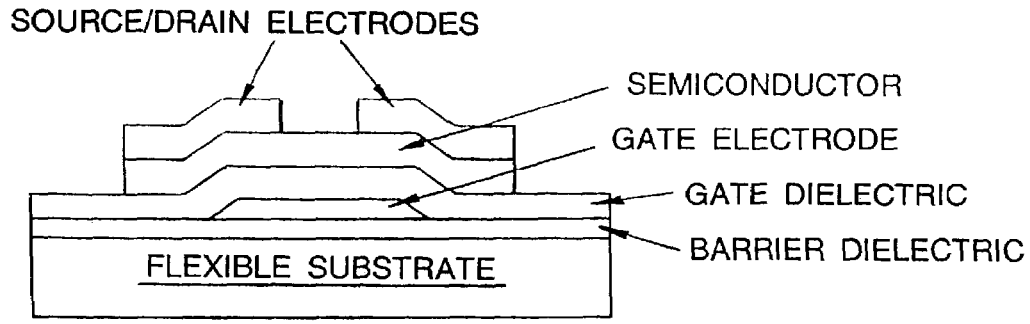

FIG. 16 shows a schematic diagram of a typical thin film transistor.

Figure 17:
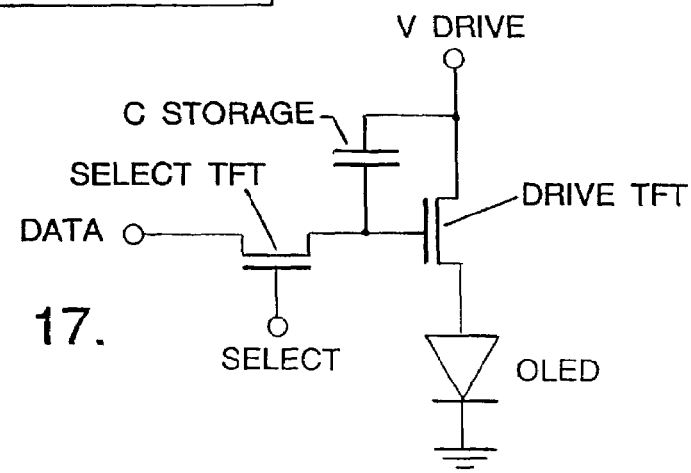

FIG. 17 shows a schematic diagram of an active matrix pixel-level circuit.

Figure 18:
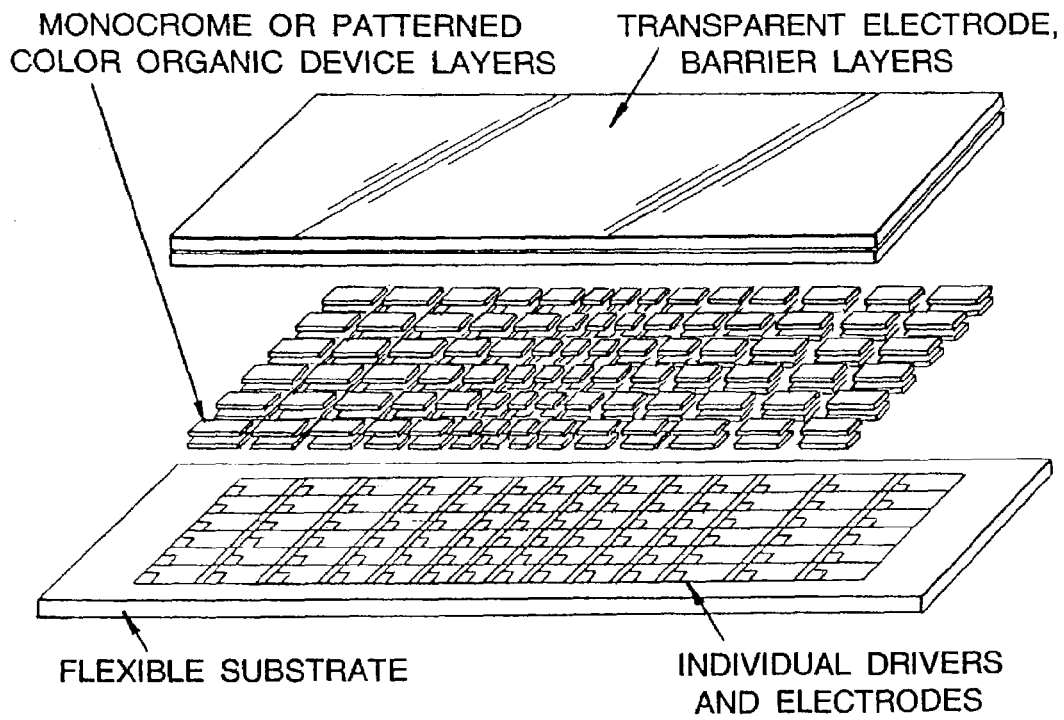

FIG. 18 shows a schematic diagram of an example OLED structure.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While a primary use of the present invention is in the field of image display systems, it will be appreciated from the following description that the invention is also useful for many types of near-eye and remote optical image displays with non-uniform resolutions.

FIG. 1 shows a continuous display with non-uniform pixel density 10. The central region of the display 12 is capable of displaying the highest resolution image because it has a higher density of pixels than the other regions of the display 14, 16, 18, 20. The extreme periphery of the display 18, 20 has the lowest resolution, the lowest pixel density. This configuration allows a viewer to see the central region of the field of view in higher resolution and the peripheral regions of the field of view in lower resolution. Intermediate peripheral regions 14, 16 to the left and right of the central field of view are displayed in intermediate resolution with pixel densities between the high resolution center 12 and low resolution peripheries 18, 20. The continuous display with non-uniform pixel density 30 of FIG. 2 exhibits similar composition in that the central field of view has higher resolution than the peripheral field of view. A central region 32 exhibits the highest density of pixels, an intermediate peripheral region 34 has a medium pixel density, and the extreme peripheral regions 36, 38 have the lowest pixel density.

The non-uniform pixel densities of the continuous displays of FIG. 1, and FIG. 2, are intended to take advantage of the foveated characteristic of vision, wherein the human eye can only detect the highest resolution in the central regions and does not suffer from the lower pixel densities in the intermediate or peripheral regions. Thus, depending on how a viewer uses the continuous display of non-uniform pixel density, the regions of higher or lower pixel densities may be arranged such that the viewer's foveated resolution is always less than the imaged resolution on the display. This prevents the viewer from being able to detect lower resolutions in the periphery of display. Depending upon the use of the display, it may be advantageous to have the intermediate or lower resolution regions of the display completely surround the central region rather than partially surround the central region. This determination would be based on a viewer's ability to recognize peripheral regions of low resolution.

The foveated pixel density may be segmented as shown in FIG. 1 and FIG. 2 or corresponding to the foveated resolution of the human eye. One of ordinary skill in the art would recognize that corresponding the pixel density to the foveated resolution of a human eye requires substantial numbers of segmented regions of the display and requires at least a minimum number of segments such that a viewer cannot detect regions of lower pixel density. One of ordinary skill in the art would also recognize that a non-uniform radius of curvature lens would create different magnification across the field of view and that an anamorphic lens is one such type of non-uniform radius of curvature lens that has different magnification across perpendicular directions. A conventional anamorphic lens changes the magnification radially from the center of the field of view, however, one of ordinary skill in the art would recognize that an anamorphic lens with non-uniform radii of curvature of magnification and shape may be best suited to provide foveated image information for half the field of view where a separate display is used for each eye.

One of ordinary skill in the art would also recognize that foveated can be used generally to describe areas of different resolutions, but may specifically refer to corresponding to the resolution of the human eye that resolves higher resolution in the central region than the peripheral region. The compression of an anamorphic lens may be designed with a display such that the foveated image of the lens matches the progression of pixel density on the display. Furthermore, one of ordinary skill in the art would understand that resolution is the measure of the ability of the human eye or a device to recognize individual converging lines, but that resolution may also be used to describe the number of pixels on a display. The resolution of a display may also be referred to in terms of pixel density, pixel spacing, pixel resolution, pixel pitch, or pixel dimensions. While each of these terms may describe a specific characteristic of a photodiode, cell, or other unitary structure of a display, they generally are related to the resolution of the display.

One of ordinary skill in the art would recognize that "continuous" can be used to distinguish a variety of different characteristics. Continuous is used throughout this application to describe displays and sensors that are unbroken in physical structure. Thus a continuous display is a unitary physical device, not a compilation of several overlapping or separated displays. While some embodiments of a continuous display of the present invention may be formed from an array of display segments, such a continuous display would have defined attachment locations, but would display the entire field of view as if the display were a single display segment. A continuous sensor has uninterrupted receiving capabilities over the intended field and does not have any holes or areas in the sensor that cause information from the field of view to be lost.

FIG. 3 shows several alternate embodiments, 50 and 53-59, of continuous displays with non-uniform pixel densities each with different foveated regions. Depending upon the intended use, higher 52 and lower 51 pixel density regions can be arranged and shaped in many variations. Some embodiments may be better suited to display an image that is provided by an anamorphic lens, such as displays with non-uniform radius of curvature and high-resolution centers 55 and 57 for example. However, one of ordinary skill in the art would recognize that the variations shown in FIG. 3 are only examples of non-uniform pixel density displays that can be created for foveated viewing.

As would be recognized in the seven lower variations 53-59 shown in FIG. 3, an optical display may consist of two continuous non-uniform pixel density displays used in tandem. Each of the displays would correspond to one of a viewer's eyes, the left display corresponding to the left eye, the right display corresponding to the right eye. Each of the continuous displays would provide foveated viewing for the central and peripheral regions of the corresponding eye. Furthermore, the central relaxed gaze of each eye would focus on a center region having the highest density of pixels for that display. A center region refers to the center of the optical axis, not the geometric center of the display. In practice, each of these tandem displays would likely be separated by a physical structure, a divider or separator, such that one eye could not view the image on the display corresponding to the other eye.

FIG. 4 shows a curved, continuous display with non-uniform pixel density. Unlike the flat displays of FIGS. 1, 2, and 3, the display 60 shown in the embodiment of FIG. 4 is curved to reduce the horizontal angle between a viewer's eyes and the image in the periphery of the display. The example shown in FIG. 4 includes a high-resolution center 62 and low-resolution peripheries 64, 66. Such a curved display may be composed of an organic light emitting diode (OLED). The optical display may be a flexible organic light emitting diode. A curved display may provide a more realistic viewing image than a flat display.

One of ordinary skill in the art would recognize that a display of the present invention may be constructed on a clear plastic substrate, allowing the viewer to see past the image through to the actual field of view. Where a separate eyepiece is used to create a virtual image near infinity of the near-eye display, the eyepiece must be lifted away or removed in some manner to facilitate the user's eyes focusing on the distance scene beyond the display of the present invention. Furthermore, the foveated viewing concept of the present invention does not demand a particular display technology. Most flexible display technologies define the pixel dimensions using either photolithography, shadow masking, printing, or similar patterning methods. The details of the fabrication of a non-uniform pixel array, therefore, depend on the particular display technology and fabrication technique. However, to one of ordinary skill in the art it is obvious how a non-uniform array may be fabricated rather than a uniform array.

One example for a fabrication process is using an organic light-emitting diode (OLED) display. This technology is useful in that it is compatible with flexible substrates and is emissive. Several alternative emissive and non-emissive display technologies exist which include, but are not limited to, electrophoretic, transmissive liquid crystal, and polymer-dispersed reflective liquid crystal displays.

Several categories of OLED technology exist and may be used to create a display of the present invention. The organic component can be either small-molecule or polymer based. OLED displays may either be passively addressed or actively addressed. In the case of a passively addressed display, the varying pitch of the pixels is defined by the dimensions of the row and column electrodes. These are defined by photolithographic and shadow mask steps. The fabrication of a varying pixel-pitch passive matrix display using photolithography and shadow masks will be obvious to those skilled in the art.

Because a primary application of a foveated display of the present invention is high resolution imaging, and because high resolution OLED displays require active matrix addressing, the fabrication of a foveated, flexible, active matrix OLED display is further described herein and is intended as an example and not intended to be limiting in any way of the different processes of fabrication of a foveated display. The first step in the fabrication process is fabrication of the active matrix array of transistors and interconnects on the supporting substrate, commonly referred to as the backplane. This has been demonstrated using a variety of semiconductor technologies. One technology is an array of amorphous silicon transistors on a flexible stainless steel or polyimide foil. A schematic diagram of a typical thin film transistor is shown in FIG. 16. These devices can be integrated with OLED pixels. A schematic diagram of an active matrix pixel-level circuit is shown in FIG. 17.

The pixel pitch for a foveated display is first defined by the spacing of the active matrix array interconnects and transistors. This is done during the various processing steps required for the backplane fabrication, and the methodology of incorporating varying pixel pitch into the patterns will be obvious to those of ordinary skill in the art. The addition of the OLED organic layers may be done by shadow mask or printing. The shadow mask or print pattern for the OLED layers in a foveated display would align to the corresponding electrode pattern on the active matrix backplane. The top electrode is deposited covering the entire active display area and is not patterned. Finally, the device must be suitably encapsulated to prevent degradation due to exposure to oxygen, moisture or other gases present in the ambient that are known to degrade OLED performance. A schematic diagram of the entire structure is shown in FIG. 18.

Depending on the nature of a display, the drive electronics may need to be specifically designed according to the non-uniform pixel pitch. For example, in an OLED display in which brightness is proportional to current, a uniform brightness display requires that the display drivers must scale with the pixel area. Therefore, an array of non-uniform drivers must be used. However, for voltage-dependent displays, this may not be necessary. One of ordinary skill in the art would recognize that there are many other ways of creating foveated displays and other ways to fabricate a foveated OLED.

FIG. 5 shows a similar continuous, curved display 70 of non-uniform pixel density. However, unlike the display shown in FIG. 4, the display shown in FIG. 5 is composed of flat panel segments 72, 74, 76, 78, 80 that have been merged together to form one continuous display 70 with non-uniform pixel density. While the array display in FIG. 5 may not be able to provide a continuous or non-uniform radius of curvature, the angled construction can reduce the horizontal angle between the image and a viewer's eyes.

Similar displays are shown in FIG. 6 and FIG. 7 corresponding to those of FIG. 4 and FIG. 5. However, the displays of FIG. 6 and FIG. 7 are composed of two continuous non-uniform pixel density displays 90, 110, FIG. 6 composed of two continuous curved structures 92, 94 and FIG. 7 composed of two continuous arrays of segments connected at angles to approximate continuous curved displays 112, 114. The continuous curved structures 92, 94 of FIG. 6 are composed of high-resolution 96, 98 and low-resolution 100, 102 areas of the display. The continuous arrays of segments 112, 114 of FIG. 7 are composed of high-resolution 116, 118, medium-resolution 120, 122, and low-resolution 100, 102 areas of the display. These displays are only examples of the present invention and are not meant to limit the application of the present invention into different display types or resolution arrangements.

FIG. 8 is a block diagram of a display system 130 using a continuous display with non-uniform pixel density 134. The hardware-based foveated viewing system 130 includes an image source 132 and an image display 134. The image source will likely include a lens 136 and a radiation sensitive device 138 or appropriately adapted camera to detect and record the field of view projected through the lens 136. The image information from the radiation sensitive device 138 would be transmitted to the image display 134. If the image source 132 captures the field of view in a foveated characteristic, the image display 134 will likely include a non-uniform pixilated display of the same foveated characteristics of the image source 132. This creates a hardware-based foveated viewing system that does not require image interpolation between an image source and an image display. Not shown in FIG. 8 is a support member which allows the image source 132 and image display 134 to be mounted to a physical structure such as a helmet which can be used by a viewer. Alternatively, the image source 132 and image display 134 may be remotely coupled by a remote transmitter not shown, to allow separate physical locations of the image source 132 and the image display 134. Many variations of helmet or head-mounted displays are useful in providing a near-eye viewing system.

FIG. 9 includes an image processor 144 in the display system 140. This image processor 144 may include an interpolation module 152, a gain module 154, or a clipping module 156. An interpolation module 152 is capable of converting the resolution of an image source 142 to different resolutions for segmented resolutions of an image display or display array 150. A gain module 154 may be included in the image processor 144 to elevate or strengthen the amplitude of all or various signals from the image source 142 so a viewer may clearly resolve all images on the display. A clipping module 156 may be included in the image processor 144 to prevent damage to a viewer's eyes from an exceptionally bright and damaging image source in the field of view.

FIG. 10 includes a merge module 182 as part of the image processor 164 to combine several source signals in the image source 162. For example, in FIG. 10 the image source 162 is capable of receiving wavelengths in the visible light spectrum 167, infrared spectrum 168, and ultraviolet spectrum 169.

Each of these input signals may be combined before being sent to the image display 170. An infrared microbolometer may be used to capture the IR image data. Depending on the lens used, any or all of these image source signals may need to be processed by the interpolation module 180 before being merged to ensure that the merged module 182 correctly fuses corresponding areas and resolutions in the field of view. One of ordinary skill in the art will recognize that FIGS. 8, 9 and 10 are examples of foveated display systems and not limiting of potential applications of the present invention.

FIGS. 11 and 12 show cross-sectional representations of viewer's using alternate embodiments of the present invention as seen from above 190, 192, 194, 196 in FIG. 11 and from the side 200 in FIG. 12. One of ordinary skill in the art would understand these figures to be examples and representations of variations on the use of the displays of the present invention.

FIG. 13 is a schematic diagram of a hardware-based foveated viewing system 210 of the present invention. The wide-angle field of view 212 is captured by an anamorphic lens 214 that projects the field of view 212 onto a camera or radiation sensitive device 218 such as in a CCD or CMOS detector. The image information is directly transmitted 220 to the foveated display 222 which presents a foveated image 224 to the viewer's eye 226. By capturing the wide field of view 212 using an anamorphic or non-uniform radius or curvature lens 214, the display system 210 is able to capture and display the field of view 212 on a corresponding foveated display without requiring image interpolation software. The viewer, while not seeing the field of view entirely in high resolution, is capable of resolving all areas of the field of view at the maximum resolution capable by a human eye thereby reducing image bandwidth while maintaining a high resolution central field of view. Where two displays are used to present a single field of view, a separate camera can provide the image for half of the field of view as captured through a corresponding anamorphic lens for that half of the field of view. The compression of an anamorphic, non-uniform radius of curvature lens may match the progression of pixel density on the foveated display. The correlation between compression of the anamorphic lens and the non-uniform pixel density of the display allows for the hardware-based foveated viewing system. If image sources are captured by two separate lenses and cameras or additional lenses and cameras, the image sources may be combined electronically or digitally by an image merge module in an image processor to provide a single image information dataset for a continuous display or display array.

FIG. 14 shows a cross-sectional representation of a head-mounted display apparatus 230 using a foveated viewing image source 234 and a continuous display 240 with non-uniform pixel density as seen from the side. The embodiment shown in FIG. 14 has the image source 234 and image display 240 mounted to a helmet support member 232 to provide for a head-mounted system and near-eye visual display. The image source 234 shown in FIG. 14 includes a non-uniform radius of curvature lens 236 and a radiation sensitive device 238. A particular advantage of using organic light emitting displays (OLEDs) or polymer light emitting displays (PLEDs) for combat visual display systems is the avoidance of glass breakage which could result in severe damage to a viewer's eyes as when using glass panelled liquid crystal displays (LCDs). Also, backlighting is not necessary with OLEDs and PLEDs that are electroluminescent and, thus, emit light. OLEDs or PLEDs that are built on a clear plastic substrate are particularly advantageous for aircraft or combat uses where a viewer may need to see beyond the displayed device to the actual field of view. Additionally, a foveated display with increased peripheral vision is particularly useful in combat situations where the viewer may benefit from seeing a wide field of view.

Each of the examples in FIGS. 11-14 include a display of the present invention and a corresponding eyepiece that can create a virtual image of the display near infinity to compensate for the location of a display near the viewer's eyes. Such an eyepiece should be designed to preserve the peripheral vision, possibly using a wrap-around lens design.

FIG. 15 shows alternate embodiments of lens and camera arrangements for hardware-based foveated viewing systems of the present invention. Particular combinations of lenses, cameras, and displays minimize the amount of image interpolation or image fusion required of an image processor by reducing image data bandwidth. A single anamorphic lens and linear sensor 250 are useful with a single display with non-uniform pixel density, such as a curved OLED or panel array of LCDs. Two anamorphic lenses and linear sensors 260 may be useful when using two displays of non-uniform pixel arrays, corresponding to each eye of the viewer. Each anamorphic lens and linear sensor may provide image source information for a corresponding display to half the field of view. Alternatively, linear lenses may be used with anamorphic radiation sensors 270 to provide the same effect of capturing a foveated image source. If a linear lens and linear radiation sensor are used 280, image interpolation may be required by an image processor to provide foveated image source information to a display with non-uniform pixel density. If more than one image source is used 290 for a single display, image fusion may be required by an image merge module in an image processor. Where a display is segmented into higher and lower resolution regions, several source lenses and radiation sensors 300, 302 can be used to capture the entire field of view, wherein each camera and lens captures a corresponding segment of the field of view with a specific resolution and location for the visual display.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An image display device comprising:
   an optical display panel having a center region and a peripheral region that at least partially surrounds the center region;
   a plurality of light emitting pixels disposed within the optical display panel such that a greater pixel density exists in the center region than in the peripheral region; and
   a pattern of drivers and electrodes disposed on a substrate supporting the plurality of light emitting pixels,
   wherein the center region includes at least one center-region pixel and the peripheral region includes at least one peripheral region pixel having a physical size greater than a size of the center region pixel,
   wherein the physical size of the at least one peripheral-region pixel is increased in two dimensions to produce a lower pixel density in the peripheral region as compared to the center region, and wherein the pattern of drivers and electrodes are disposed underneath the plurality of light emitting pixels in a configuration where a lower density of drivers and electrodes exist in the peripheral region as compared to the center region.

2. The device of claim 1, wherein the peripheral region completely surrounds the central region.

3. The device of claim 1, wherein the optical display panel further defines a medial region that at least partially surrounds the center region and wherein the plurality of light emitting pixels are disposed within the optical display panel such that greater pixel density exists in the center region than in the medial region and greater pixel density exists in the medial region than in the peripheral region.

4. The device of claim 3, wherein the medial region completely surrounds the center region.

5. The device of claim 1, wherein the plurality of light emitting pixels are disposed within the optical display panel such that the pixel density is foveated.

6. The device of claim 5, wherein the foveated pixel density approximates the foveated resolution of a human eye.

7. The device of claim 1, wherein at least one region of the optical display panel including the plurality of light emitting pixels comprises a radial curvature.

8. The device of claim 1, wherein the optical display panel has a unitary physical structure.

9. The device of claim 7, wherein the at least one region is concave.

10. The device of claim 1, wherein the optical display panel comprises an organic light emitting diode display panel or array of organic light emitting diode display segments.

11. The device of claim 10, wherein the optical display panel comprises a flexible organic light emitting diode display panel.

12. The device of claim 1, wherein the optical display panel comprises a polymer light emitting diode display panel or an array of polymer light emitting diode display segments.

13. The device of claim 1, wherein the optical display panel comprises a liquid crystal display panel or an array of liquid crystal display segments.

14. The device of claim 1, wherein the optical display panel comprises a clear plastic substrate.

15. An image display device comprising:
a first optical display panel having a first center region and a first peripheral region that at least partially surrounds the first center region;
a first plurality of light emitting pixels disposed within the first optical display panel such that a greater pixel density exists in the first center region than in the first peripheral region,
said first center region including at least one first center-region pixel and said first peripheral region including at least one first peripheral-region pixel having a physical size greater than a size of the first center-region pixel, wherein the physical size of the at least one first peripheral-region pixel is increased in two dimensions to produce a lower pixel density in the first peripheral region as compared to the first center region;
a second optical display panel having a second center region and a second peripheral region that at least partially surrounds the second center region;
a second plurality of light emitting pixels disposed within the second optical display panel such that a greater pixel density exists in the second center region than in the second peripheral region; and
a pattern of drivers and electrodes disposed on support members for the first and second plurality of light emitting pixels,
wherein the second center region includes at least one second center-region pixel and the second peripheral region includes at least one second peripheral-region pixel having a physical size greater than a size of the second center-region pixel, and the physical size of the at least one second peripheral-region pixel is increased in two dimensions to produce a lower pixel density in the second peripheral region as compared to the second center region, and
wherein the pattern of drivers and electrodes are disposed underneath the first and second plurality of light emitting pixels in a configuration where a lower density of drivers and electrodes exist in the first and second peripheral regions as compared to the first and second center regions.

16. The device of claim 15, wherein the first and second optical display panels do not overlap.

17. An image display device comprising:
a first optical display panel having a left center region and right periphery region;
a second optical display panel having a right center region and a left periphery region;
wherein the first and second optical display panels do not overlap; and
a plurality of light emitting pixels disposed within the first and second optical display panels such that a greater pixel density exists in the left center region and the right center region than in the right periphery region and the left periphery region, and
a pattern of drivers and electrodes disposed on a support member supporting the plurality of light emitting pixels,
wherein the left and right center regions include at least one center-region pixel and the left and right peripheral regions include at least one peripheral-region pixel having a physical size greater than a size of the center-region pixel,
wherein the physical size of the at least one peripheral-region pixel is increased in two dimensions to produce a lower pixel density in the left and right peripheral regions as compared to the left and right center regions, and
wherein the pattern of drivers and electrodes are disposed underneath the plurality of light emitting pixels in a configuration where a lower density of drivers and electrodes exist in the left and right peripheral regions as compared to the left and right center regions.

18. The device of claim 17, wherein the plurality of light emitting pixels are disposed within the optical display panels such that the pixel density is foveated.

19. The device of claim 18, wherein the foveated pixel density approximates the foveated resolution of a human eye.

20. The device of claim 17, wherein the first and second optical display panels have unitary physical structures.

21. The device of claim 17, wherein the first and second optical display panels including the plurality of light emitting pixels are concave.

22. The device of claim 17, wherein the first and second optical display panels comprise organic light emitting diode displays panels or arrays of organic light emitting diode display segments.

23. The device of claim 17, wherein the first and second optical display panels comprise liquid crystal display panels or arrays of liquid crystal display segments.

24. A display system comprising:
a support member;
an image source adapted to generate foveated imagery and affixed to the support member; and
an image display adapted to display foveated imagery, affixed to the support member, and coupled to the image source, comprising:
   an optical display panel having a center region and a peripheral region that at least partially surrounds the center region;
   a plurality of light emitting pixels disposed within the optical display panel such that a greater pixel density exists in the center region than in the peripheral region; and
   a pattern of drivers and electrodes disposed on the support member supporting the plurality of light emitting pixels,
wherein the center region includes at least one center-region pixel and the peripheral region includes at least one peripheral-region pixel having a physical size greater than a size of the center-region pixel,
wherein the physical size of the at least one peripheral-region pixel is increased in two dimensions to produce a lower pixel density in the peripheral region as compared to the center region, and
wherein the pattern of drivers and electrodes are disposed underneath the plurality of light emitting pixels in a configuration where a lower density of drivers and electrodes exist in the peripheral region as compared to the center region.

25. The system of claim 24, wherein the arrangement of pixel density on the image display corresponds to the foveated imagery of the image source.

26. The system of claim 25, wherein the foveated pixel density on the image display approximates the foveated resolution of a human eye.

27. The system of claim 24, wherein the image source comprises a lens.

28. The system of claim 27, wherein the lens has a non-uniform radius of curvature.

29. The system of claim 27, wherein the image source further comprises a radiation sensitive device.

30. The system of claim 29, wherein the radiation sensitive device records uniform resolution and the lens has a non-uniform radius of curvature.

31. The system of claim 29, wherein the radiation sensitive device records non-uniform resolution and the lens has a uniform radius of curvature.

32. The system of claim 27, further comprising an image processor coupled to the image source and the image display.

33. The system of claim 32, wherein the image processor comprises an image interpolation module, an image merge module, an image gain module, or an image clipping module.

34. The system of claim 32, wherein the image processor comprises an image interpolation module and an image merge module.

35. The system of claim 32, wherein the image processor further comprises an image gain module or an image clipping module.

36. The system of claim 27, wherein the support member comprises a helmet.

37. The system of claim 27, wherein the image source is adapted to record electromagnetic radiation in the visible light spectrum.

38. The system of claim 27, wherein the image source is adapted to record electromagnetic radiation at wavelengths other than in the visible light spectrum.

39. The system of claim 27, wherein the image source is adapted to record electromagnetic radiation at infrared wavelengths.

40. The system of claim 27, wherein the image source is adapted to record electromagnetic radiation at ultraviolet wavelengths.

41. The system of claim 27, wherein the image source comprises at least two lens and radiation sensitive device pairings.

42. The system of claim 27, further comprising a retinal-tracker coupled to the image source.

43. The system of claim 27, further comprising a head-tracker coupled to the image source.

44. The display system of claim 27, further comprising a remote transmitter coupled to the image source and the image display.

45. A display system comprising:
a support member;
an image source adapted to generate foveated imagery and affixed to the support member; and
an image display adapted to display foveated imagery, affixed to the support member, and coupled to the image source system comprising:
   a first optical display panel having a left center region and right periphery region;
   a second optical display panel having a right center region and a left periphery region;
   wherein the first and second optical display panels do not overlap; and
a plurality of light emitting pixels disposed within the first and second optical display panels such that a greater pixel density exists in the left center region and right center region than in the right periphery region and the left periphery region, and
a pattern of drivers and electrodes disposed on the support member supporting the plurality of light emitting pixels,
wherein the left and right center regions include at least one center-region pixel and the left and right peripheral regions include at least one peripheral-region pixel having a physical size greater than a size of the center-region pixel,
wherein the physical size of the at least one peripheral-region pixel is increased in two dimensions to produce a lower pixel density in the left and right peripheral regions as compared to the left and right center regions, and
wherein the pattern of drivers and electrodes are disposed underneath the plurality of light emitting pixels in a configuration where a lower density of drivers and electrodes exist in the left and right peripheral regions as compared to the left and right center regions.

46. The system of claim 45, wherein the arrangement of pixel density on the image display corresponds to the foveated imagery of the image source.

47. The system of claim 46, wherein the foveated pixel density on the image display approximates the foveated resolution of a human eye.

48. The device of claim 1, wherein the peripheral region further comprises segmented regions having a uniform pixel density within the segmented regions, and respective pixel densities of the segmented regions decrease with a distance from the center region.

49. The device of claim 48, wherein a number of the segmented regions is in a range from one to the number of pixels in the peripheral region.

50. The device of claim 48, wherein a size of any one of the segmented regions is in a range from the size of the peripheral region down to a single pixel.

51. The device of claim 24, wherein the peripheral region further comprises segmented regions having a uniform pixel density within the segmented regions, and respective pixel densities of the segmented regions decrease with a distance from the center region.

52. The device of claim 51, wherein a number of the segmented regions is in a range from one to the number of pixels in the peripheral region.

53. The device of claim 51, wherein a size of any one of the segmented regions is in a range from the size of the peripheral region down to a single pixel.

54. The device of claim 1, wherein the plurality of light emitting pixels are disposed within the optical display panel such that an arrangement of the light emitting pixels corresponds to the foveated resolution of the human eye.

55. The device of claim 1, wherein the plurality of light emitting pixels is disposed within the optical display panel such that the pixel density changes continuously across the optical display panel.

56. The device of claim 24, wherein the plurality of light emitting pixels are disposed within the optical display panel such that an arrangement of the light emitting pixels corresponds to the foveated resolution of the human eye.

57. The device of claim 24, wherein the plurality of light emitting pixels is disposed within the optical display panel such that the pixel density changes continuously across the optical display panel.

58. The device of claim 24, wherein the image source is configured to provide a foveated image to the plurality of light emitting pixels.

59. The device of claim 45, wherein the image source is configured to provide a foveated image to the plurality of light emitting pixels.

* * * * *